United States Patent
Usgaonkar et al.

(10) Patent No.: US 8,793,447 B2
(45) Date of Patent: Jul. 29, 2014

(54) RESTORATION OF A PARENT LUN THROUGH MODIFICATION OF A READ-WRITE CLONE LUN AS THE PARENT LUN

(75) Inventors: Ameya Prakash Usgaonkar, Bangalore (IN); Kamlesh Advani, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 713 days.

(21) Appl. No.: 12/749,516

(22) Filed: Mar. 30, 2010

(65) Prior Publication Data

US 2011/0246733 A1 Oct. 6, 2011

(51) Int. Cl.
*G06F 12/00* (2006.01)

(52) U.S. Cl.
USPC ............................ 711/162; 711/161; 711/163

(58) Field of Classification Search
None
See application file for complete search history.

(56) References Cited

U.S. PATENT DOCUMENTS

| | | | |
|---|---|---|---|
| 7,051,050 B2 * | 5/2006 | Chen et al. | 707/679 |
| 2009/0006794 A1 * | 1/2009 | Mizuta et al. | 711/162 |
| 2009/0144515 A1 * | 6/2009 | Benari | 711/162 |
| 2010/0077160 A1 * | 3/2010 | Liu et al. | 711/162 |
| 2011/0106764 A1 * | 5/2011 | Wu et al. | 707/639 |

* cited by examiner

*Primary Examiner* — Matthew Bradley
*Assistant Examiner* — Daniel Tsui
(74) *Attorney, Agent, or Firm* — Klein, O'Neill & Singh, LLP (57) ABSTRACT

A method, apparatus and system of restoration of a parent LUN through modification of a read-write clone LUN as the parent LUN are disclosed. In one embodiment, the method includes transforming a snapshot of a parent LUN from a read-only state to a read-write clone LUN using a target module of a storage system. The method also includes changing a first data structure of a block transfer protocol to refer to the parent LUN as another clone LUN. Further, the method includes modifying a second data structure of the block transfer protocol to refer to the read-write clone LUN as the parent LUN. Then, the method includes restoring the parent LUN when the modification of the second data structure is completed.

19 Claims, 10 Drawing Sheets

DATA STRUCTURE VIEW 550
OF THE DATA BLOCK 116

RESTORATION OF A PARENT LUN THROUGH MODIFICATION OF A READ-WRITE CLONE LUN AS THE PARENT LUN

FIELD OF TECHNOLOGY

This disclosure relates generally to data storage and management and, in one example embodiment, to a method, apparatus and system of restoration of a parent LUN through modification of a read-write clone LUN as the parent LUN.

BACKGROUND

A host device may want to restore a parent LUN (e.g., a Logical Unit Number that corresponds to a physically addressable storage unit) for a variety of reasons (e.g., swap, data protection, split, merge). The parent LUN may be located on a volume of a storage system (e.g., the volume may have many LUNs) that is accessible to the host device through a network (e.g., a local area network, a wide area network, a storage area network).

To restore the parent LUN, the system may need to restore every LUN on the volume because a restore operation may need to be performed at a volume level. Restoration at the volume level may be space inefficient because additional storage space may be required for restoration of LUNs that the host device does not request. For example, during a restore operation, the volume may not be available for a read/write request from the host device. Thus, the volume may be offline for a period of time. Even when the restore operation occurs in the background, processing cycles may be wasted during a block transfer. Similarly, processing cycles may be wasted when the restore operation is performed using indirect blocks. The restore operation using indirect blocks may not be accessible through a command line interface and may consume added space on the storage system. Consequently, additional processing power and time may be needed (e.g., because of more storage I/O, meta-data lookups for the I/O) to restore the unrequested LUNs resulting in productivity losses and delay. As a result, network performance may be degraded.

SUMMARY

A method, apparatus and system of restoration of a parent LUN through modification of a read-write clone LUN as the parent LUN are disclosed. In one aspect, a method includes transforming a snapshot of a parent LUN from a read-only state to a read-write clone LUN using a target module of a storage system. The method also includes changing a first data structure of a block transfer protocol to refer to the parent LUN as another clone LUN, and modifying a second data structure of the block transfer protocol to refer to the read-write clone LUN as the parent LUN. In addition, the method includes restoring the parent LUN when the modification of the second data structure is completed.

When the modification of the second data structure is completed another clone LUN may be deleted. Further, the first data structure may be updated to point a read request and a write request to a restored parent LUN. An identical data instance of the read-only clone LUN and the parent LUN may be coalesced in a data block of the volume of the storage system. The block transfer protocol may include a Small Computer System Interface (SCSI) target of a volume of a storage system.

The snapshot may be a point-in-time, a consistent image, and a read-only version of the parent LUN that may correspond to a physically addressable storage unit. The snapshot may be created through a deduplication operation in which unique data blocks of the parent LUN and the snapshot are stored in the volume of the storage system and a meta-data referencing the unique data blocks may be created. The snapshot may be a read-only clone LUN of the parent LUN presented to a host device.

In another aspect, a system includes a host device having an initiator that requests a restoration of a parent LUN, a network, and a storage system coupled to the host device through the network to restore the parent LUN by marking a read-write clone LUN of a previous parent LUN as the parent LUN.

The storage system may delete the previous parent LUN now marked as another clone LUN when the restoration is completed. The data structures of the previous parent LUN and the read-write clone LUN may be switched so that the previous parent LUN may be referenced as another clone LUN and the read-write clone LUN may be referenced as the parent LUN.

In yet another aspect, a method includes modifying a first data structure of a block transfer protocol to refer to a parent LUN as another clone LUN, and creating a restored parent LUN through a modification of a second data structure of the block transfer protocol to reference a read-write clone LUN as the parent LUN. In addition, the method includes marking a restoration operation as successful when the modification of the first data structure and the second data structure is complete, and deleting another clone LUN when the restoration operation is successful.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of restoration of a parent LUN through modification of a read-write clone LUN as the parent LUN are disclosed. Although the present embodiments have been described with reference to specific example embodiments, it will be evident that various modifications and changes may be made to these embodiments without departing from the broader spirit and scope of the various embodiments.

Figure 1:
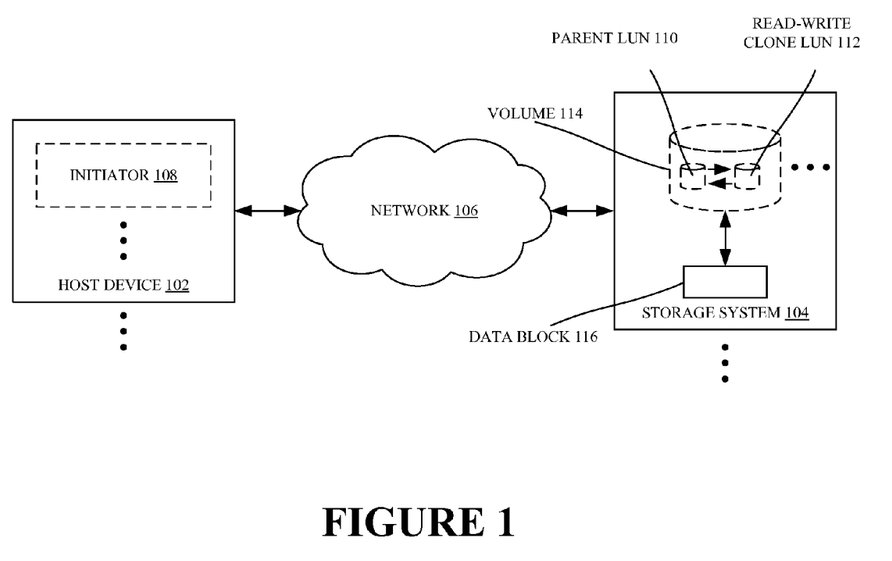
FIG. 1 illustrates a host device communicating with a storage system through a network, according to one embodiment.

FIG. 1 illustrates a host device 102 communicating with a storage system 104 through a network 106. The host device 102 may be a data processing system that performs operations on the storage system 104. The host device 102 includes an initiator 108 in the embodiment illustrated in FIG. 1. The storage system 104 includes a volume 114 and a data block 116 in the embodiment illustrated in FIG. 1. The volume 114 includes a parent LUN 110 and a read-write clone LUN 112.

The host device 102 may be a general-purpose computer configured to execute applications, such as database applications. Moreover, the host device 102 may interact with the storage system 104 in accordance with a client/server information delivery model. For example, the host device 102 may request the services of the storage system 104, and the storage system 104 may return the results of the services requested by the host device 102 by exchanging packets defined by an appropriate networking protocol.

Figure 2:
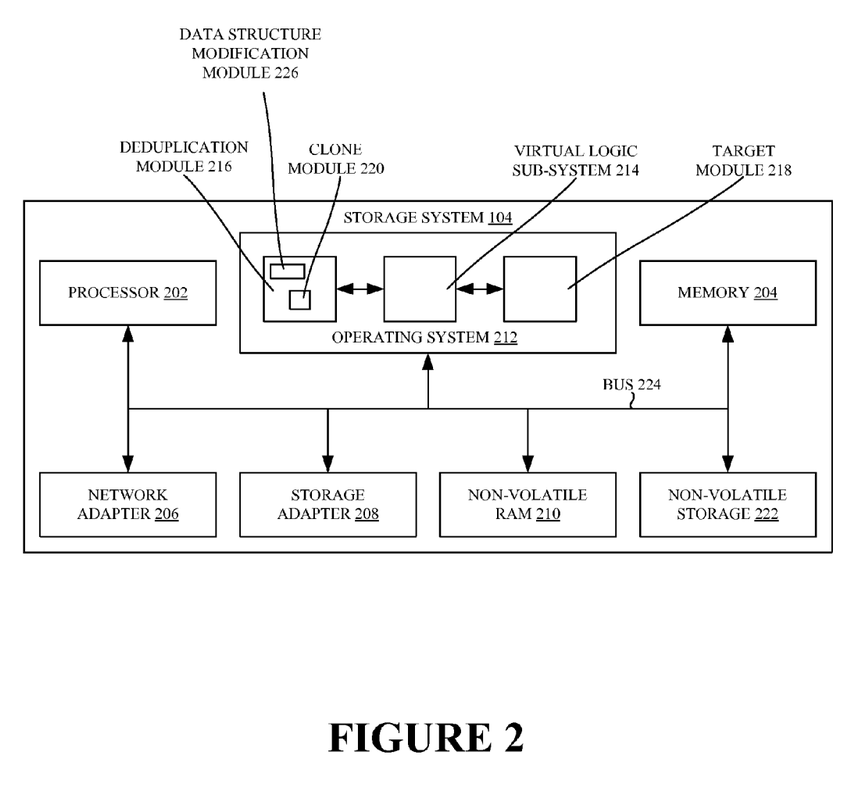
FIG. 2 is a block diagram of the storage system having a processor and a memory, according to one embodiment.

The network 106 may be a Storage Area Network (SAN). For the purposes of this description, the term "network" may include any acceptable network architecture. The network 106 may interconnect with a number of clients (e.g., the host device 102) to the storage system 104. The storage system 104 may be configured to control storage of data and access to data that is located in a non-volatile storage 222 (as illustrated in FIG. 2) of the storage system 104.

In some embodiments, network 106 can be a local area network (LAN), a wide area network (WAN), a virtual private network (VPN) using communication links over the Internet, for example, or any combination of network types. The storage system 104 may directly communicate with the host device 102 as a Network Attached Storage (NAS) device or as a Direct Attached Storage (DAS) device. The storage system 104 may operate in a hybrid SAN-NAS environment. For example, the storage system 104 may offer file-serving capabilities and also serve blocks over a Fibre Channel SAN.

It is noted that the principles of various embodiments described herein are applicable to any type of NAS device running any type of operating system. For example, a NAS device can include the NearStore® storage system running the NetApp® Data ONTAP® operating system available from Network Appliance, Inc., Sunnyvale, Calif. Further, the principles of the various embodiments are applicable to any type of SAN.

In an example embodiment, the storage system 104 of FIG. 1 may also operate as a file server (also called a "filer"). For example, the storage system 104 may include a computer that provides file services relating to the organization of information on storage devices, such as non-volatile storage 222 as illustrated in FIG. 2.

Each "on-storage" file (e.g., on the non-volatile storage 222 of FIG. 2) may be implemented as a set of non-volatile storage blocks configured to store information, such as text, whereas the directory may be implemented as a specially-formatted file in which information about other files and directories are stored. The storage system 104 may be configured to operate according to the client/server model of information delivery to thereby allow many clients to access files stored on a server, e.g., the storage system 104.

In this model, the client (e.g., the host device 102 of FIG. 1) may include an application, such as a file system protocol, executing on a computer that communicates with storage system 104 over a computer network (e.g., the network 106), such as a point-to-point link, shared LAN, WAN, or VPN implemented over a public network such as the Internet. Each host device (e.g., the host device 102) may request services to the storage system 104 by issuing file system protocol messages (in the form of packets) to the storage system 104 over the network 106.

A type of file system according to one embodiment is a "write in-place" file system, an example of which is the Berkeley fast file system. In a write in-place file system, the locations of the data structures, such as inodes and data blocks (e.g., the data block 116) on non-volatile storage 222 of FIG. 2 can be fixed. An inode may be a data structure used to store information about a file, such as meta-data, whereas the data block may be a structure used to store the actual data for the file. The information included in an inode may include, e.g., ownership of the file, access permission for the file, size of the file, file type, and references to locations on disk of the data blocks for the file. The references to the locations of the file data may be provided by pointers, which may further reference indirect blocks that, in turn, reference the data blocks, depending upon the quantity of data in the file. Changes to the inodes and data blocks may be made "in-place" in accordance with the write in-place file system. If an update to a file extends the quantity of data for the file, an additional data block can be allocated and the appropriate inode may be updated to reference that data block.

Another type of file system according to one embodiment is a "write-anywhere" or "copy on write" file system (or the like) that does not overwrite data on disks. If a data block on disk is retrieved (read) from disk into memory and "dirtied" with new data, the data block may be stored (written) to a new location on disk to thereby optimize write performance. A write-anywhere file system may initially assume an optimal layout such that the data is substantially contiguously arranged on disks. The optimal disk layout may result in efficient access operations, particularly for sequential read operations, directed to the non-volatile storage 222 of FIG. 2. A particular example of a write-anywhere file system that can be configured to operate on the storage system 104 according to one embodiment is the Write Anywhere File Layout (WAFL®) file system available from Network Appliance, Inc. The WAFL® file system can be implemented within a microkernel as part of the overall protocol stack of the filer and associated disk storage. This microkernel may be supplied as part of Network Appliance's Data ONTAP® storage operating system, which can reside on the storage system 104, and can process file-service requests from network-attached clients.

As used in various embodiments, the term "operating system" (e.g., as illustrated in FIG. 2) may refer to the computer-executable code operable on the storage system 104 that manages data access and may implement file system semantics, such as the Data ONTAP® storage operating system, which can be implemented as a microkernel. The Data ONTAP® storage operating system is available from Network Appliance, Inc. and implements a file system, such as the WAFL® file system. According to one embodiment, the operating system 212 of FIG. 2 can also be implemented as an application program operating over a general-purpose operating system, such as UNIX® or Windows®, or as a general-purpose operating system with configurable functionality, which is configured for storage applications as described in various embodiments.

Non-volatile storage 222 can be implemented as one or more storage "volumes" that include physical storage disks, defining an overall logical arrangement of storage space. Available filer implementations can serve a large number of discrete volumes. The non-volatile storage 222 can be organized as one or more groups of RAID devices. RAID implementations can enhance the reliability/integrity of data storage through the writing of data "stripes" across a given number of physical disks in the RAID group, and the appropriate storing of parity information with respect to the striped data.

In the example of a WAFL® file system, a RAID-4 implementation can be employed, which entails striping data across a group of disks, and storing the parity within a separate disk of the RAID group. As described herein, a volume can include at least one data disk and one associated parity disk (or possibly data/parity) partitions in a single disk arranged according to a RAID-4, or equivalent high-reliability, implementation.

In another example embodiment, RAID may be partitioned into several volumes. To represent each volume a SCSI target may be configured to provide a logical unit number (LUN). SCSI is a protocol entity for physically connecting and transferring data between the host device 102 and the storage system 104. The initiator 108 of the host device 102 may initiate a SCSI session by sending a SCSI command to the storage system 104 (e.g., a SCSI target). On receiving a command from the initiator 108, the SCSCI target of the storage system 104 may provide the required LUNs.

The term "snapshot" is a trademark of Network Appliance, Inc. and is used for purposes of this description to designate a persistent consistency point (CP) image. A persistent consistency point image (PCPI) may be a point-in-time representation of the filer, and more particularly, of the active file system, stored on a storage device (e.g., on the non-volatile storage 222) or in other persistent memory. A snapshot may have a name or other identifier that distinguishes it from other PCPIs taken at other points in time. A PCPI can also include other information (meta-data) about the active file system at the particular point in time for which the image is taken. The terms "PCPI" and "snapshot" shall be used in this description without derogation of Network Appliance's trademark rights. For example, the snapshot 302 may be viewed as an example of a read-only reference store. In contrast, the active file system may be viewed as an example of an active store that permits read and write operations.

The snapshot 302 (as illustrated in FIG. 3A-D) can be viewed as a restorable version of a file system created at a predetermined point in time. In various embodiments, snapshots can be created on a regular schedule. The snapshot 302 may be stored on a volume 114 of the storage system 104 along with the active file system. The parent LUN 110 may be an original LUN assigned to a logical unit which is addressed by the actual I/O operations.

FIG. 2 is a block diagram of the storage system 104 having a processor 202 and a memory 204 on which the various embodiments described herein may be implemented. However, it will be understood by one skilled in the art that the concepts described herein apply to any type of file server and/or storage device, wherever implemented, including on a special-purpose computer, a general-purpose computer, and/or a standalone computer.

The storage system 104 in FIG. 2 includes the processor 202, the memory 204, a network adapter 206, a storage adapter 208, a non-volatile Random Access Memory (RAM) 210, and a non-volatile storage 222, all of which are interconnected by a bus 224. The operating system 212 is illustrated as including a deduplication module 216, a virtual logic subsystem 214, and a target module 218.

The deduplication module 216 may perform a deduplication operation (e.g., single instance storage (SIS) operation) to create a clone (e.g., may be read-only and/or a read-write clone) using a clone module 220 of the deduplication module 216. The virtual logic sub-system 214 may provide the clones to the target module 218 from a clone module 220 of the deduplication module 216 as illustrated in FIG. 2. The deduplication module may also include a data structure modification module 226. The data structure modification module 226 may be used to switch the data structures of the original parent LUN and a read-write clone LUN, as will be described in greater detail in FIG. 3C.

In one embodiment, the memory 204 is addressable by the processor 202 and the adapters 206 and 208 for storing software program code. The operating system 212 may functionally invoke deduplication operation with the deduplication module 216.

The network adapter 206 may include mechanical, electrical, and/or signaling circuitry needed to couple the storage system 104 to host device 102 over the network 106. The storage adapter 208 may interoperate with the operating system 212 and the non-volatile storage 222 locations. For example, the storage adapter 208 may interoperate with the operating system 212 and the non-volatile storage 222 locations associated with the volume 114 to access information requested by the host device 102 of FIG. 1. The storage adapter 208 may include input/output (I/O) interface circuitry that couples to the non-volatile storage 222 over an I/O interconnect arrangement, such as Fibre Channel. The information may be retrieved by the storage adapter 208 and, if necessary, may be processed by the processor 202 (and/or the storage adapter 208 itself) prior to being forwarded over the bus 224 to the network adapter 206, where the information can be formatted into appropriate packets and returned to the host device (e.g., the host device 102).

In one embodiment as illustrated in FIG. 2, the storage system 104 can include a non-volatile random access memory 210 (NVRAM) that can provide fault-tolerant backup of data, enabling the integrity of filer transactions to survive a service interruption based upon a power failure and/or other fault.

To facilitate the generalized access to the non-volatile storage 222, the operating system 212 may implement a file system that logically organizes the information as a hierarchical structure of directories and files on the non-volatile storage 222. Each "on-storage" file (or on-disk file) may be implemented as a set of disk blocks configured to store information, such as data, whereas the directory may be implemented as a specially formatted file in which other files and directories are stored. As noted above, in an exemplary embodiment described herein, the operating system 212 of the storage system 104 may be the NetApp® Data ONTAP® operating system available from Network Appliance, Inc., that implements the WAFL® file system. It is noted that any other appropriate file system can be used, and as such, where the terms "WAFL" or "file system" are used, those terms should be interpreted broadly to refer to any file system that is adaptable to the teachings of the various embodiments disclosed herein.

Figure 3A:
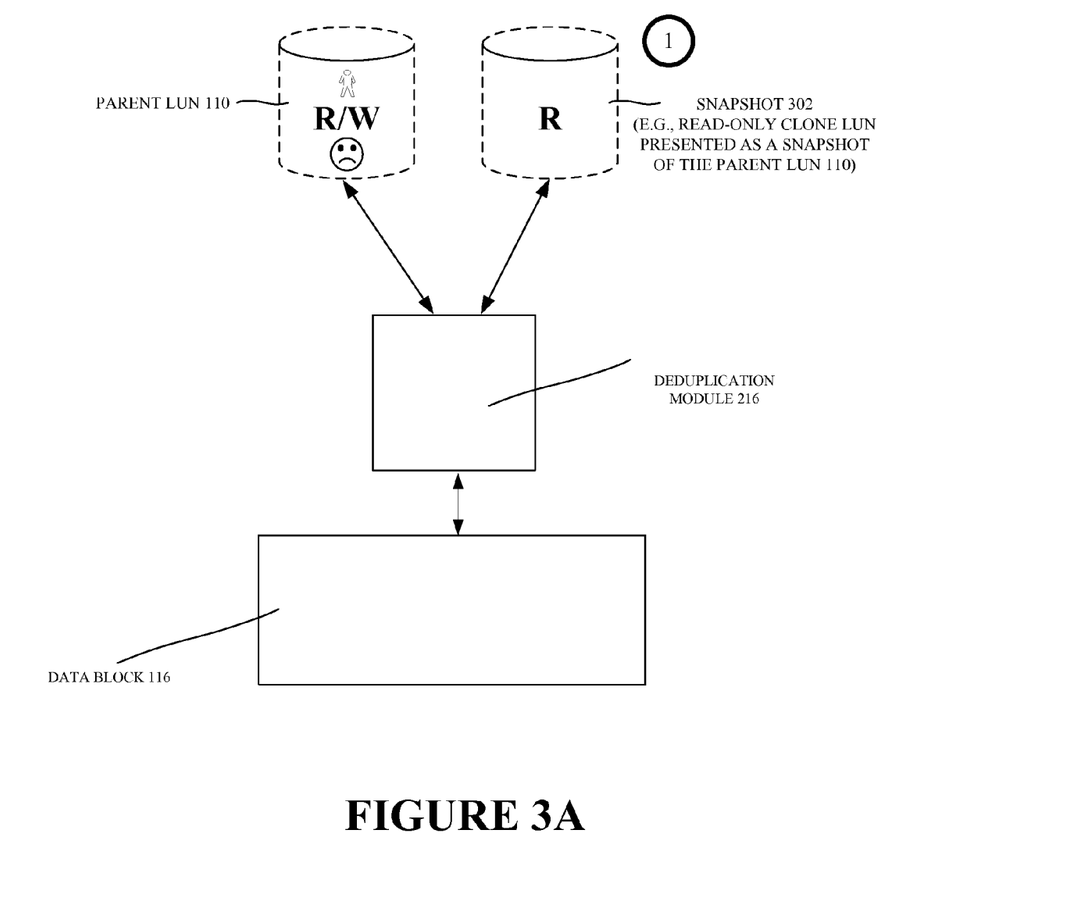
FIG. 3A is a graphical process flow illustrating a snapshot of a parent LUN, according to one embodiment.

FIG. 3A is a graphical process flow illustrating a snapshot 302 of a parent LUN 110, according to one embodiment. The parent LUN 110 is depicted with a 'sad face' in FIG. 3A to illustrate that it is a LUN that needs to be restored. The unique data blocks which are shared by the parent LUN 110 and the snapshot 302 may be stored in the volume 114 of the storage system 104. A meta data referring to the unique data blocks may be created in the volume 114. The meta data may include a data about the data blocks, for example name, size, address, data type etc. The deduplication operation may be a deduplication operation (e.g., a SIS operation) in which a unique block shared between the parent LUN 110 and snapshot 302 are stored in the volume 114 of the storage system 104.

The parent LUN 110 and the snapshot 302 may share a common block (e.g., the data block 116) via a data duplication (SIS) infrastructure (e.g., the deduplication module 216). The snapshot 302 may be a read only clone LUN of the parent LUN 110, which is presented to the host device 102. The snapshot 302 may be a point-in-time image, a consistent image, and/or a read only version of the parent LUN 110 that corresponds to a physically addressable storage unit. In operation 'circle 1' of FIG. 3A, an identical data of the parent LUN 110 and the snapshot 302 (e.g., a read only version of the parent LUN 110) may be coalesced using the deduplication module 216, so that they may share a common data block (e.g., the data block 116) of the volume 114.

Figure 3B:
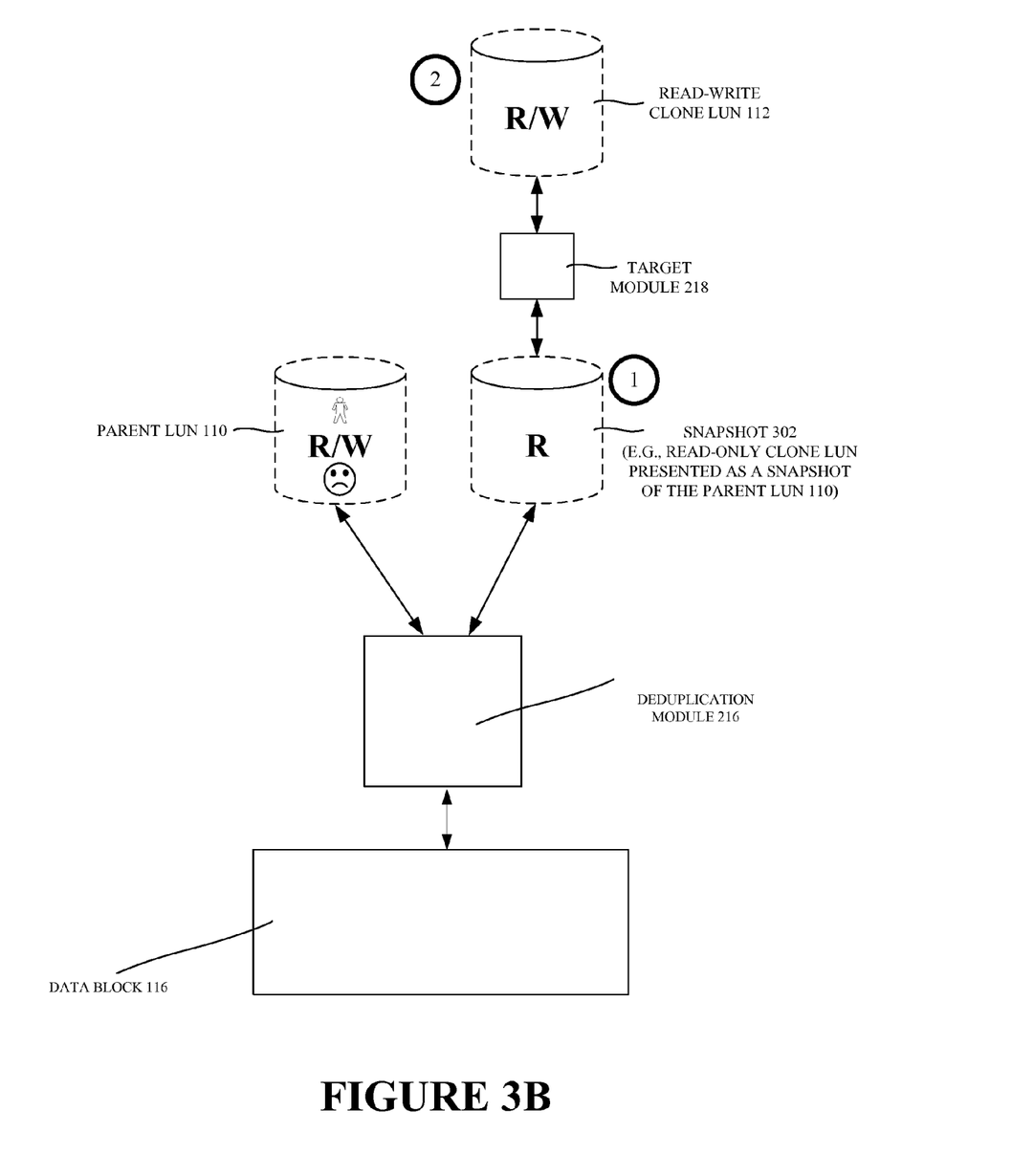
FIG. 3B is a graphical process flow illustrating a read-write clone LUN created from the snapshot of the parent LUN of FIG. 3A, according to one embodiment.

FIG. 3B is a graphical process flow illustrating a read-write clone LUN 112 created from the snapshot 302 of the parent LUN 110 of FIG. 3A, according to one embodiment. The snapshot 302 which is a read-only clone LUN of the parent LUN 110 may be transformed to read-write clone LUN 112 using the target module 218, in operation 'circle 2'. The snapshot 302 may be altered from read-only state to a read-write state through the deduplication module 216 as illustrated in FIG. 3B. The deduplication module 216 may perform deduplication operation to produce an optimized data (e.g., the read-write clone LUN 112).

Figure 3C:
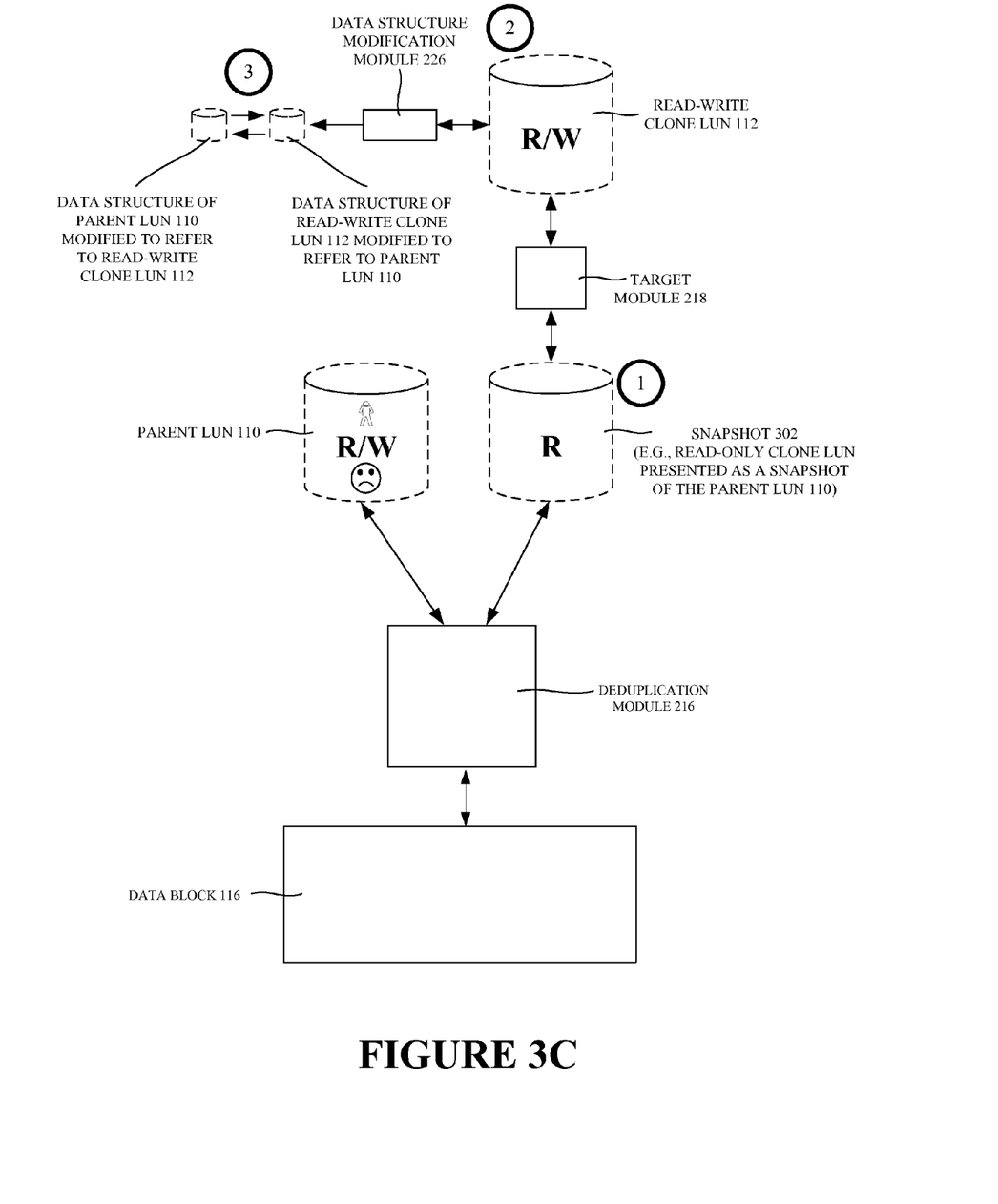
FIG. 3C is a graphical process flow illustrating an application of a data structure modification module to switch data structures of the snapshot and the read-write clone LUN of FIG. 3B, according to one embodiment.

FIG. 3C is a graphical process flow illustrating an application of a data structure modification module 226 to switch data structures of the snapshot 302 and the read-write clone LUN 112 of FIG. 3B, according to one embodiment. Further to operation 'circle 2' of FIG. 3B operation 'circle 3' is depicted in FIG. 3C. In operation 'circle 3', the data structure of the read-write clone LUN 112 may be modified to refer the parent LUN 110. In addition, the data structure of the parent LUN 110 may be modified to refer the read-write clone LUN 112.

Figure 3D:
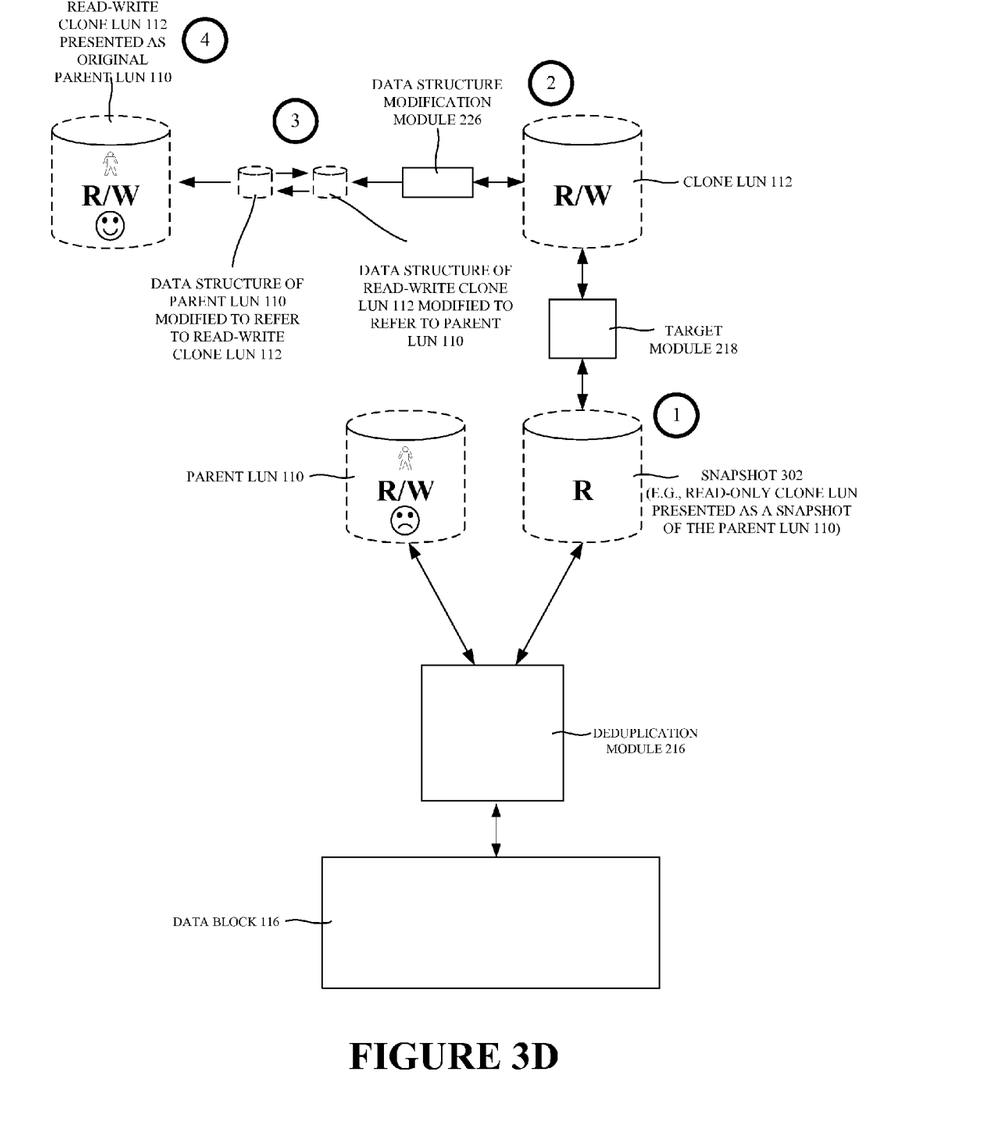
FIG. 3D is a graphical process flow illustrating a presentation of the read-write clone LUN as the original parent LUN after the switch of FIG. 3C is complete, according to one embodiment.

In other words, the modified data structures of the parent LUN 110 and the read-write clone LUN 112 may be switched through the data structure modification module 226. When the switch is complete, the original parent LUN may be deleted. FIG. 3D is a graphical process flow illustrating a presentation of the read-write clone LUN 112 as the original parent LUN 110 after the switch of FIG. 3C is complete, according to one embodiment in operation 'circle 4'. Through this method, the parent LUN 110 is restored, as shown in FIG. 3D with the 'happy face' indicator associated with operation circle '1'.

Figure 4:
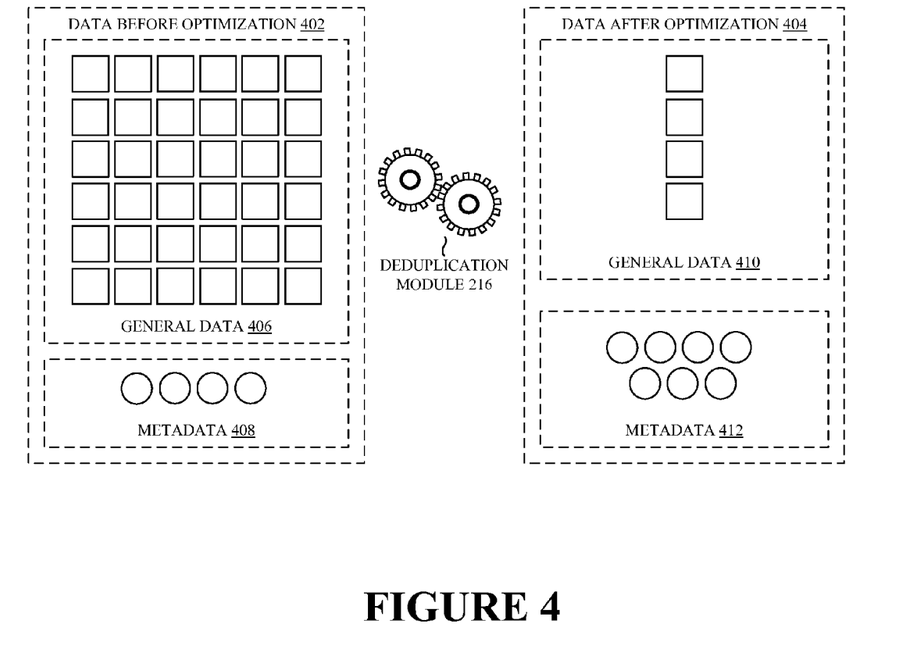
FIG. 4 is a diagrammatic view that illustrates data deduplication operation in a volume of the storage system, according to one embodiment.

FIG. 4 is a diagrammatic view that illustrates data deduplication operation in a volume of the storage system, according to one embodiment. In particular, FIG. 4 illustrates a data before optimization 402 and a data after optimization 404. The data before optimization 402 includes a general data 406 (e.g., content) and a meta-data 408 (e.g. information that describes the general data 406). Similarly, the data before optimization 402 includes a general data 410 (e.g., content) and a meta-data 412 (e.g. information that describes the general data 406). A block level deduplication operation is illustrated in the embodiment of FIG. 4. The deduplication operation may be provided for the volume 114 (e.g., may be a flexible volume that can dynamically increase in capacity) on the storage system such as the storage system 104 (e.g., fibre attached storage, Data ONTAP®, V-series system). The storage system 104 may provide a block level deduplication operation through the deduplication module 216 as previously described in FIG. 2 and as illustrated in FIG. 4.

The deduplication module 216 of FIG. 4 may perform a deduplication operation to produce an optimized data (e.g., data after optimization 404). The deduplication operation may allow storing unique data blocks in the flexible volume (e.g., the volume 114 of FIG. 1) and may create a small amount of meta data.

In an embodiment illustrated in FIG. 4 newly stored data blocks may be stored as general data on a flexible volume (e.g., the volume 114 of FIG. 1) of the storage system 104. The data blocks may be stored at a granular level of 4 KB in the general data segment or at a finer granularity. Each data block may have a digital finger print and during a deduplication process each finger print may be compared with the other finger prints in the flexible volume. The finger print may be a unique digital signature for every 4 KB data block. If two finger prints in the volume are found to be same, then a byte-for byte comparison may be performed for all the bytes in the block. Further, if an exact match occurs between the new data block and the existing data block, the duplicate data block may be discarded and a disk space in the storage system (e.g., the storage system 104) may be regained.

The deduplication operation may be enabled on several flexible volumes in the storage system 104. In an example embodiment, up to eight deduplication process can run concurrently on eight volumes within the same storage system 104 of FIG. 1. In another example embodiment, the deduplication operation may be performed on a scheduled day at a specific time and/or may be performed manually through a command line interface (CLI). When 20% of new data is written to the volume, deduplication process may run automatically on the volume. Also, deduplication process may run automatically.

When deduplication process runs for the first time on a flexible volume with existing data, the blocks in the flexible volume may be scanned and a fingerprint database may be created. The fingerprint database may include a sorted list of all fingerprints associated with the used blocks in the flexible volume. The fingerprints in the database may be checked for duplicates. If two fingerprints are found to be same, a byte-by-byte comparison of the blocks may be made to ensure that the two blocks are undeniably identical. Further, if the two blocks are found to be identical, the data block's pointer may be updated to the already existing data block and the duplicate data block may be released.

Figure 5:
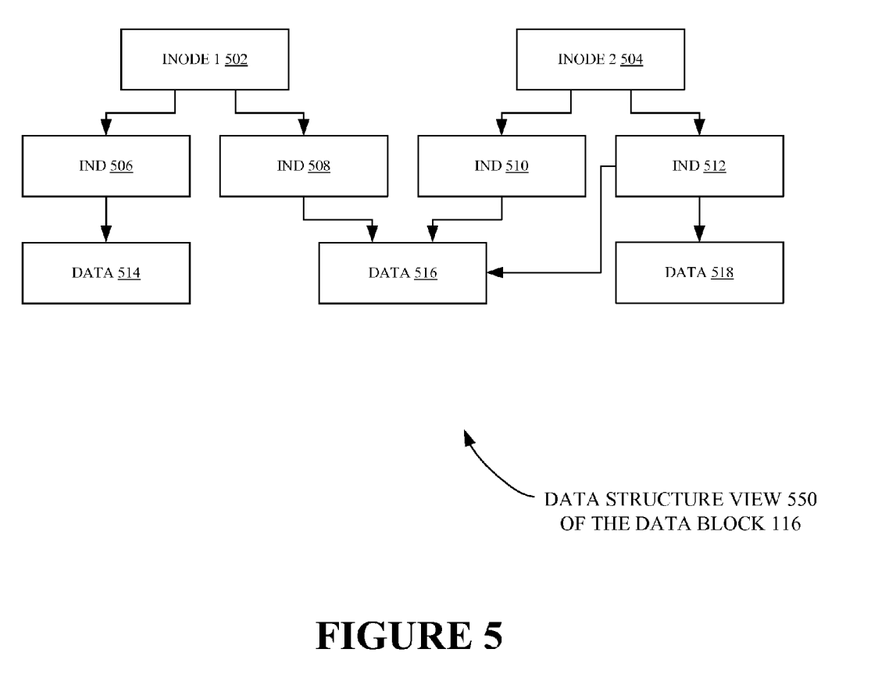
FIG. 5 is a block diagram of a data structure illustrating sharing of data blocks in a volume, according to one embodiment.

FIG. 5 is a block diagram of a data structure illustrating sharing of data blocks in a volume, according to one embodiment. In an embodiment illustrated in FIG. 5, three data blocks (e.g., a data 514, a data 516 and a data 518) are used for five references thereby saving two blocks. Each data block may have a block count reference kept in a metadata. The indirect blocks (e.g., an IND 506, an IND 508, an IND 510, and an IND 512) may point to one or more of a data (the data 514, data 516, and data 518). For example, the IND 506 may refer to the data 514, the IND 508 and the IND 510 may refer to the data 516, and the IND 512 may refer to the data blocks 516 and 518. In another aspect, additional indirect blocks may point to the data blocks and/or the existing indirect blocks may stop pointing to the data blocks. When there is no pointer to a data block, the data block may be released thereby reducing storage consumption.

The maximum sharing for a data block may be 255. For example, if there are 500 duplicate blocks, deduplication may reduce that to only 2 blocks. The releasing of a duplicate data block may require updating pointers of indirect inode (e.g., an inode 1 502, an inode 2 502 as illustrated in FIG. 5) to refer to an existing data block.

When an additional data is written to the de-duplicated volume, a fingerprint is created for each new block, and a change log file may be updated. The change log file may be sorted and sorted fingerprints thereof may be merged with the fingerprints of the fingerprint database. There may be a fingerprint record for each 4 KB data block and the fingerprints for all the data blocks in the volume may be stored in the fingerprint database file.

Figure 6:
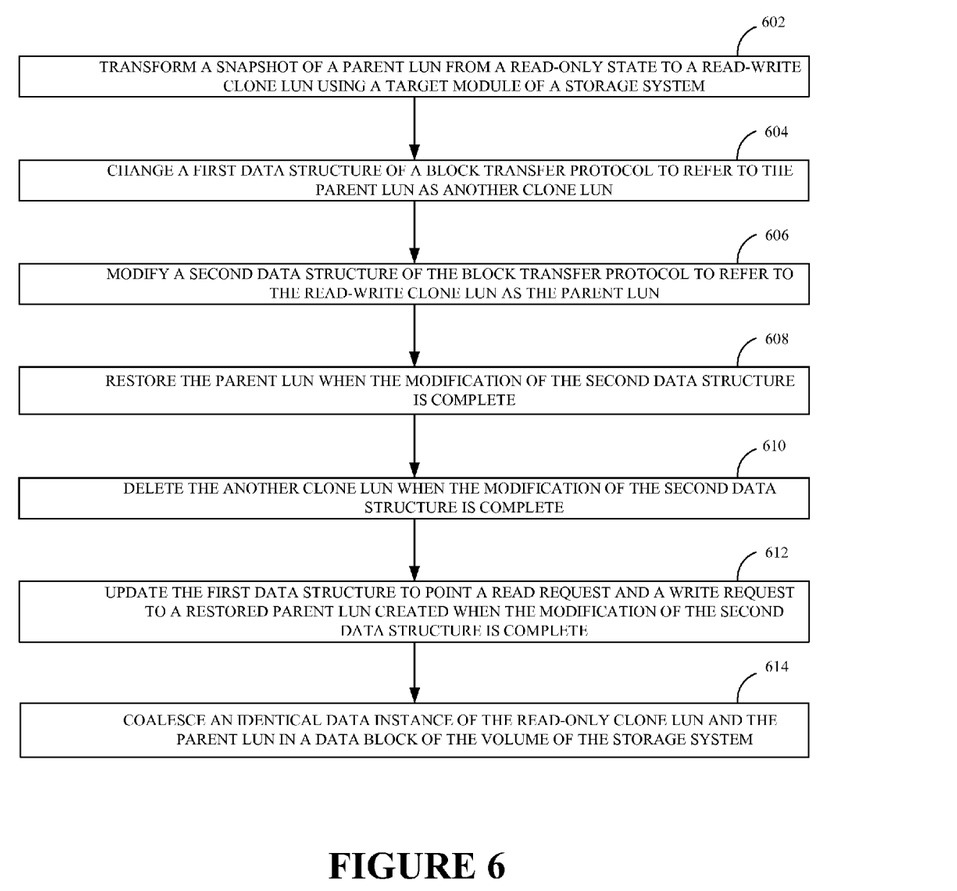
FIG. 6 is a process flow that illustrates restoration of a parent LUN from a snapshot of the parent LUN, according to one embodiment.

FIG. 6 is a process flow that illustrates restoration of a parent LUN from a snapshot of the parent LUN, according to one embodiment. In operation 602, a snapshot (e.g., the snapshot 302 of FIG. 3A) of a parent LUN (e.g., the parent LUN 110 of FIG. 3A) may be transformed from a read-only state to a read-write clone LUN 112 (of FIG. 3B) using a target module (e.g., the target module 218 of FIG. 2) of a storage system (e.g., the storage system 104 of FIG. 1). In operation 604, a first data structure of a block transfer protocol may be changed (e.g., using the data structure modification module 226 of FIG. 2) to refer to the parent LUN 110 as another clone LUN (e.g., so that the original parent LUN may later be deleted when the restoration is complete). In operation 606, a second data structure of the block transfer protocol may be modified to refer to the read-write clone LUN 112 as the parent LUN 110 (e.g., so that it may later take the place of the original parent LUN). In operation 608, the parent LUN 110 may be restored when the modification of the second data structure is completed (e.g., because the read-write clone LUN may now be presented as the original parent LUN).

In operation 610, the another clone LUN (e.g., the original parent LUN) may be deleted when the modification of the second data structure is completed. In operation 612, the first data structure may be updated to point a read request and a write request to a restored parent LUN. In operation 614, an identical data instance of the snapshot 302 (e.g., read-only clone LUN) and the parent LUN may be coalesced in a data block (e.g., the data block 116 of FIG. 1) of the volume (e.g., the volume 114 of FIG. 1) of the storage system 104 (e.g., using the data deduplication module 216).

Figure 7:
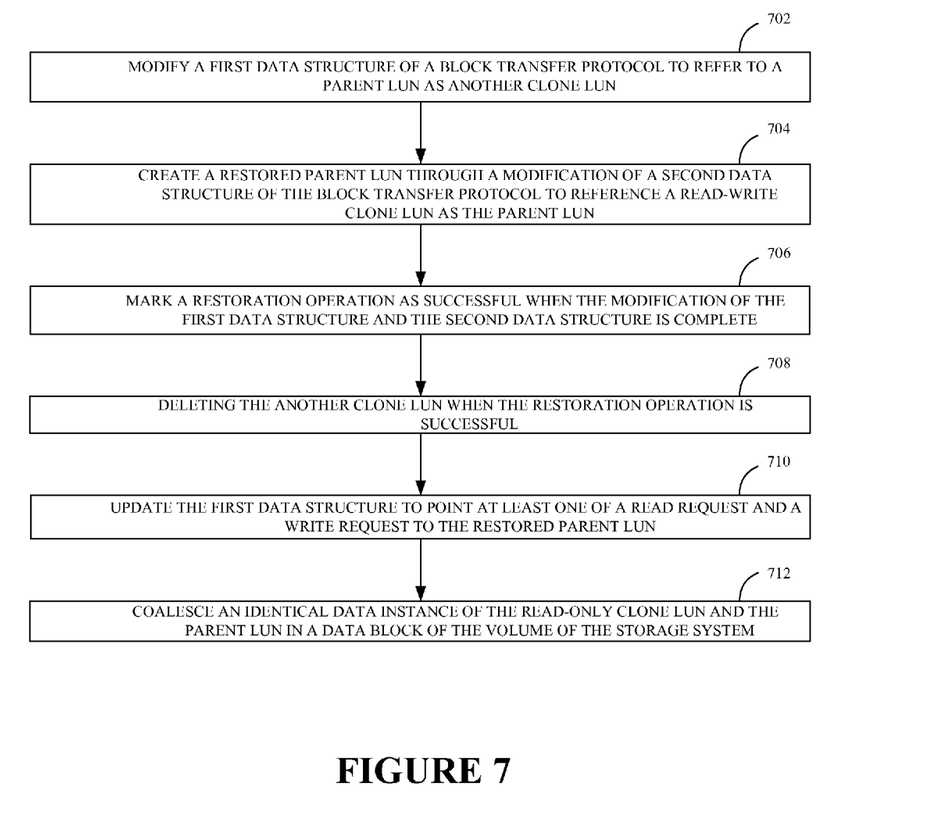
FIG. 7 is a process flow illustrating modification of data structures associated with a block transfer protocol to restore a parent LUN, according to one embodiment.

FIG. 7 is a process flow illustrating modification of data structures associated with a block transfer protocol to restore a parent LUN, according to one embodiment. In operation 702, a first data structure of a block transfer protocol may be modified to refer to a parent LUN (e.g., the parent LUN 110) as another clone LUN (as illustrated in FIG. 3C). In operation 704, a restored parent LUN may be created through a modification of a second data structure of the block transfer protocol to reference a read-write clone LUN (e.g., the read-write clone LUN 112) as the parent LUN 110 (as illustrated in FIG. 3D). In operation 706, a restoration operation can be marked as successful when the modification of the first data structure and the second data structure is completed. In operation 708, another clone LUN (e.g., the original parent LUN) may be deleted when the restoration operation is successful. In operation 710, the first data structure may be updated to point one or more of a read request and a write request to the restored parent LUN. In operation 712, an identical data instance of the read-only clone LUN and the parent LUN 110 may be coalesced in a data block (e.g., the data block 116 of FIG. 1) of a volume (e.g., the volume 114 of FIG. 1) of the storage system 104 (e.g., using the data deduplication module 216).

Although the present embodiments have been described with reference to specific example embodiments, it will be evident that various modifications and changes may be made to these embodiments without departing from the broader spirit and scope of the various embodiments. Additionally, the various embodiments described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). It is also within the scope of an embodiment to implement a program or code that can be stored in a machine-readable medium to permit a computer to perform any of the methods described above.

The above description of illustrated embodiments, including what is described in the abstract, is not intended to be exhaustive or to limit the claims to the precise forms disclosed. While specific embodiments of, and examples for, the claims are described herein for illustrative purposes, various equivalent modifications are possible within the scope of the claims, as those skilled in the relevant art will recognize.

These modifications can be made to the embodiments in light of the above detailed description. The terms used in the following claims should not be construed to limit the claims to the specific embodiments disclosed herein. Rather, the scope of the embodiments is to be determined entirely by the following claims, which are to be construed in accordance with established doctrines of claim interpretation. Accordingly, the specification and drawings are to be regarded in an illustrative rather than a restrictive sense.

What is claimed is:

1. A machine implemented method for restoring a parent logical unit number (LUN) from a snapshot of the parent LUN, comprising:
    transforming the snapshot of the parent LUN from a read-only state to a read-write clone LUN using a target module of a storage operating system;
    changing a first data structure of a block transfer protocol to refer to the parent LUN as another clone LUN such that the parent LUN can be deleted after restoring the parent LUN;
    modifying a second data structure of the block transfer protocol to refer to the read-write clone LUN as the parent LUN; and restoring the parent LUN by presenting the read-write clone LUN as the parent LUN, when the modification of the second data structure is complete.

2. The method of claim 1 further comprising:
deleting the another clone LUN when the modification of the second data structure is complete.

3. The method of claim 1, wherein the block transfer protocol comprises a small computer system interface (SCSI) target of a volume of a storage system, and wherein the snapshot is at least one of a point-in-time, a consistent image, and a read-only version of the parent LUN that corresponds to a physically addressable storage unit.

4. The method of claim 1 further comprising:
updating the first data structure to point at least one of a read request and a write request to a restored parent LUN created when the modification of the second data structure is complete.

5. The method of claim 1, wherein the snapshot is a created through a deduplication operation in which unique data blocks of the parent LUN and the snapshot are stored in the volume of the storage system and a meta-data is created that references the unique data blocks.

6. The method of claim 5 wherein the snapshot is a read-only clone LUN presented to a host device as the snapshot of the parent LUN.

7. The method of claim 6 further comprising:
coalescing an identical data instance of the read-only clone LUN and the parent LUN in a data block of the volume of the storage system.

8. The method of claim 1, wherein a machine is caused to perform the method of claim 1 when a set of instructions in a form of a machine-readable medium is executed by the machine.

9. A system comprising:
a host device having an initiator that requests a restoration of a parent LUN;
a network; and
a storage system coupled to the host device through the network to restore the parent LUN by transforming a read-only copy of the parent LUN as a read-write clone LUN and then marking the read-write clone LUN as the parent LUN for presenting the read-write clone LUN as the parent LUN;
wherein data structures of the parent LUN and the read-write clone LUN are switched so that the parent LUN is referenced as another clone LUN and the read-write clone LUN is referenced as the parent LUN to present the read-write clone LUN as the parent LUN; and wherein the parent LUN can be deleted by deleting the another clone LUN after restoring the parent LUN.

10. The system of claim 9 wherein the storage system to delete the parent LUN now marked as another clone LUN when the restoration is complete.

11. The system of claim 9, wherein the read-write clone LUN is created from a snapshot of the previous parent LUN, and wherein the snapshot is at least one of a point-in-time, a consistent image, and the read-only clone LUN of the parent LUN that corresponds to a physically addressable storage unit.

12. The system of claim 11, wherein the snapshot is a created through a deduplication operation in which unique data blocks of the parent LUN and the read-only clone LUN are stored in a volume of the storage system and a meta-data is created that references the unique data blocks.

13. The system of claim 12 wherein the snapshot is the read-only clone LUN presented to the host device as the snapshot of the parent LUN.

14. The system of claim 13 wherein an identical data instance of the read-only clone LUN and the parent LUN is coalesced in a data block of the volume of the storage system.

15. A machine implemented method for restoring a parent LUN (logical unit number) from a snapshot of the parent LUN, comprising:
modifying a first data structure of a block transfer protocol to refer to the parent LUN as another clone LUN such that the parent LUN can be deleted after being restored;
creating a restored parent LUN through a modification of a second data structure of the block transfer protocol to reference a read-write clone LUN as the parent LUN and presenting the read-write clone as the parent LUN;
wherein the read-write clone LUN of the parent LUN is generated by transforming a read-only state of a read-only clone of the parent LUN to a read-write state;
marking a restoration operation as successful when the modification of the first data structure and the second data structure is complete; and
deleting the another clone LUN that refers to the parent LUN when the restoration operation is successful.

16. The method of claim 15, wherein the block transfer protocol comprises a small computer system interface (SCSI) target of a volume of a storage system, and wherein the snapshot is at least one of a point-in-time, a consistent image, and a read-only version of the parent LUN that corresponds to a physically addressable storage unit.

17. The method of claim 15 further comprising:
updating the first data structure to point at least one of a read request and a write request to the restored parent LUN.

18. The method of claim 15, wherein the snapshot is a created through a deduplication operation in which unique data blocks of the parent LUN and the snapshot are stored in the volume of the storage system and a meta-data is created that references the unique data blocks, and wherein the snapshot is a read-only clone LUN presented to a host device as the snapshot of the parent LUN.

19. The method of claim 15 further comprising:
coalescing an identical data instance of the read-only clone LUN and the parent LUN in a data block of the volume of the storage system.

* * * * *